H. EHLEN.
AUTOMATIC LAMP CONTROLLER.
APPLICATION FILED APR. 1, 1914.

1,175,248.

Patented Mar. 14, 1916.
2 SHEETS—SHEET 1.

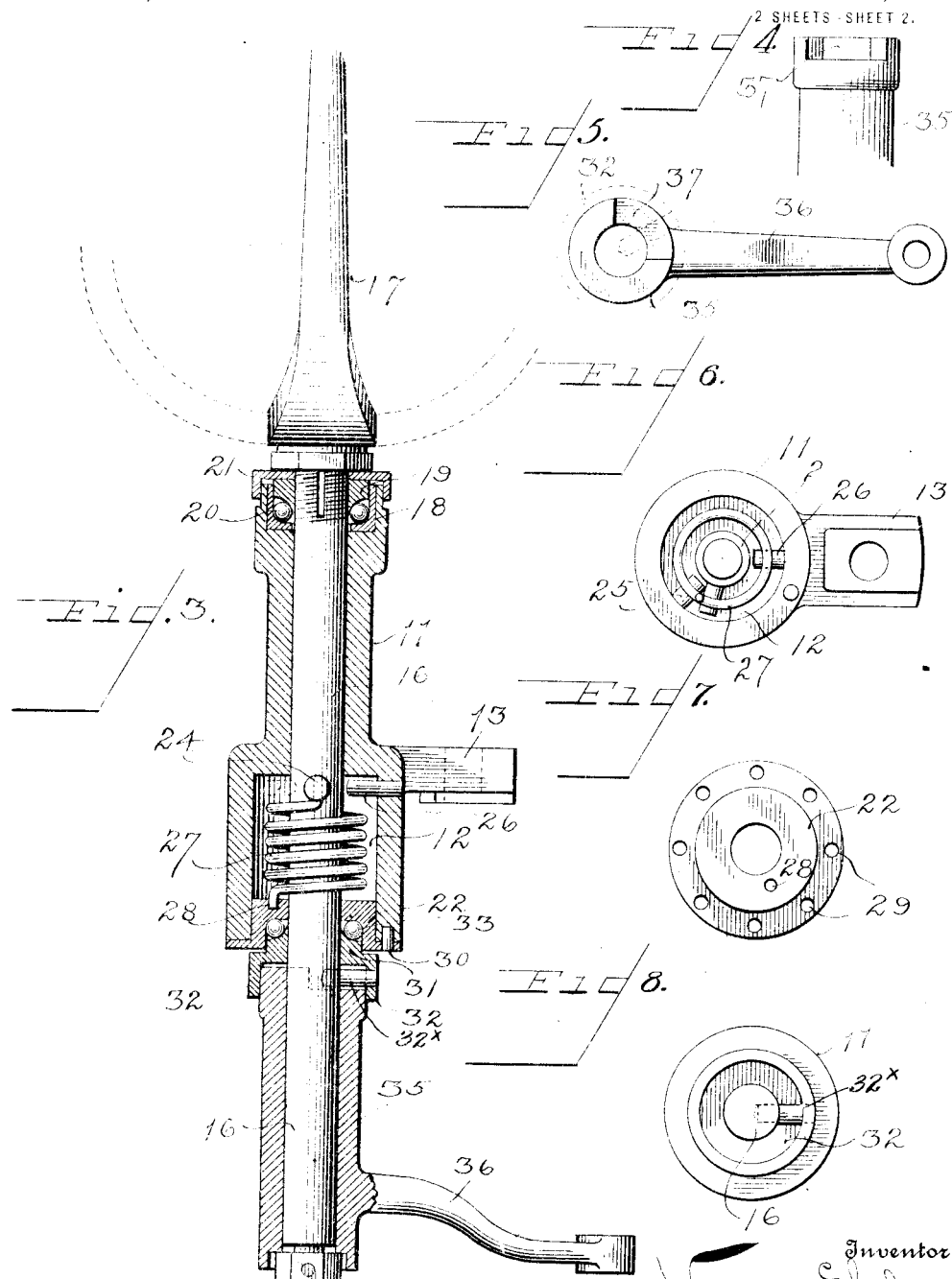

UNITED STATES PATENT OFFICE.

HENRY EHLEN, OF COVINGTON, OHIO, ASSIGNOR TO THE AUTOMATIC LAMP CONTROL COMPANY, OF DAYTON, OHIO, A CORPORATION OF OHIO.

AUTOMATIC LAMP-CONTROLLER.

1,175,248.  Specification of Letters Patent.  Patented Mar. 14, 1916.

Application filed April 1, 1914. Serial No. 828,848.

*To all whom it may concern:*

Be it known that I, HENRY EHLEN, citizen of the United States, residing at Covington, in the county of Miami and State of Ohio, have invented certain new and useful Improvements in Automatic Lamp-Controllers, of which the following is a specification.

My invention relates to vehicle lamps and particularly to means for automatically controlling the movement of the lamp whereby the shaft of light will be immediately varied with each deviation of the vehicle from a straight path.

The object of the invention is to simplify the structure as well as the means and mode of operation of such devices whereby they will not only be cheapened in construction, but will be more efficient in use, positive and automatic in action and unlikely to get out of repair.

With the above primary and other incidental objects in view as will more fully appear in the specification, the invention consists of the features of construction, the parts and combinations thereof and the mode of operation or their equivalents as hereinafter described and set forth in the claims.

Figure 1:
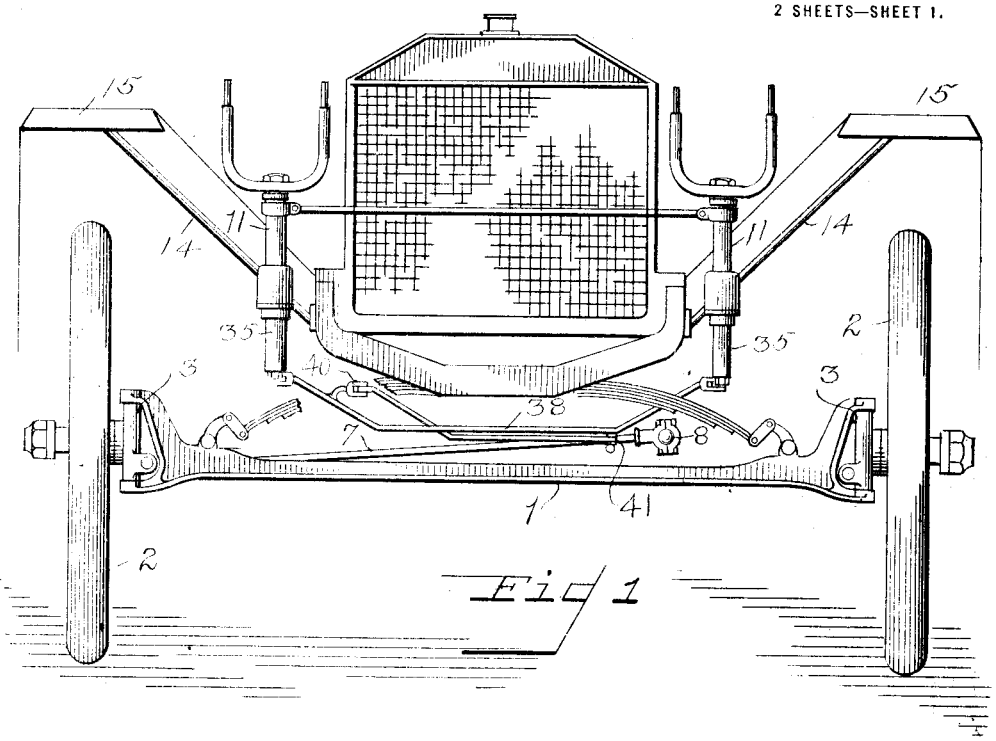
Figure 2:
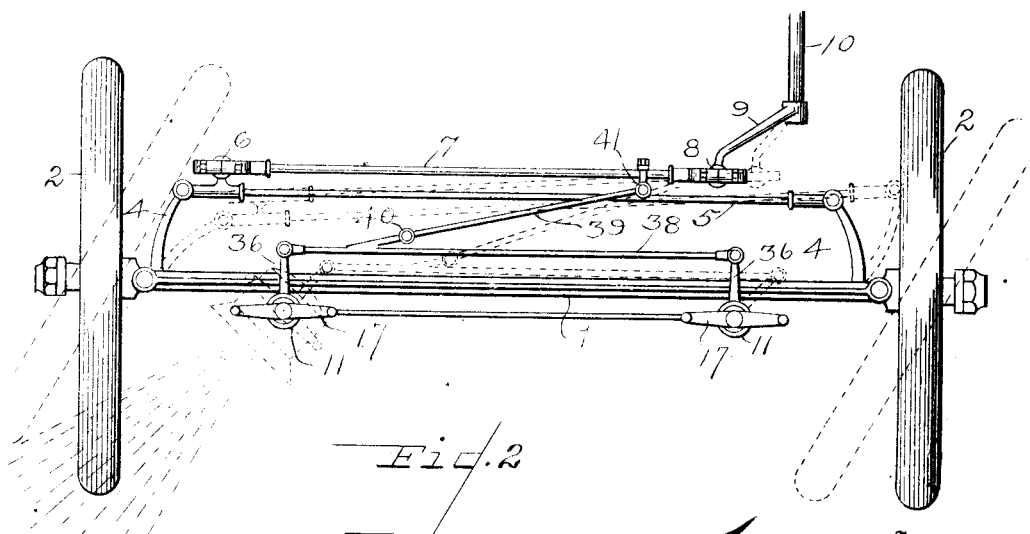

Referring to the drawings, Figure 1 is a front elevation of an automobile of popular construction, to which the automatic lamp controller, forming the subject matter hereof has been applied. Fig. 2 is a detail plan view of the steering connections of the automobile and the actuating connection of the adjustable lamp. Fig. 3 is a vertical sectional view of the assembled lamp support. Figs. 4 and 5 are detail views of the adjusting arm, Fig. 6 is a bottom plan view of the lamp support with the adjusting arm and lower bearing removed. Fig. 7 is a detail plan view of the lower bearing cup. Fig. 8 is a bottom plan view of the support with the adjusting arm removed.

Like parts are indicated by similar characters of reference throughout the several views.

In the drawings there is shown an automobile of ordinary and popular construction of which 1 is the front axle and 2—2 the guiding wheels which are pivotally connected with the axle 1 by the usual knuckles 3. The knuckles 3 are oscillated in unison about their connections with the axle 1 by means of radial operating arms 4 connected one with the other by a transverse connecting rod 5. Connected with the rod 5 by means of a universal joint 6 located adjacent to one end thereof is a pitman 7 connected at its opposite end by a similar universal joint 8 with the crank or rock arm 9 carried by the steering post 10. Thus at each oscillation of the steering post 10 and its connected crank or arm 9, the pitman 7 is reciprocated to effect a corresponding reciprocation of the transverse connecting rod 5 which in turn causes the oscillation of the guiding wheel 2—2 about the pivotal connections of the knuckles 3 with the axle 1. This is the usual steering mechanism of this particular type of automobile and forms no part of the present invention. As hereinafter described the lamps are connected to operate in unison with the movement of the steering apparatus before mentioned.

The primary object of the present invention is to provide improved means for independently operating the oscillatory lamps in accordance with the deviation of the vehicle from a straight path. The construction and arrangement is such that so long as the vehicle travels in a straight path both adjustable lamps will be maintained in positions to direct their shafts of light straight ahead in the path of travel. However should the vehicle be turned to the right the corresponding lamp will be automatically oscillated in unison with the turning of the wheels but to a greater degree than the angle to which the forward or guiding wheels are turned, thereby directing the shaft of light from the right hand lamp into the region toward which the vehicle is being turned while the opposite lamp is maintained in a position to direct its shaft of light straight forward in alinement with the vehicle. Upon turning to the left, the operation is reversed and the left hand lamp being turned in unison with but to a greater degree than the initial angular position of the wheel while the right hand lamp is maintained in alinement with the vehicle body. I am aware that such constructions or devices for accomplishing the same results are well known in the art. One of the difficulties heretofore experienced and which have been overcome by the present invention is the tendency of such devices to rattle or chatter and to eventually work loose as a result of the constant jar and vibration to which they are subjected. Applicant has overcome this difficulty by providing extended bearing sleeves and widely spaced bearings and by a harmonious arrangement of the operating parts, whereby any looseness or play will be minimized and the general operation of the device materially improved.

In construction of the lamp support there is employed an elongated stationary bearing sleeve 11, having at its lower end an enlarged counter bore or chamber 12. This bearing sleeve 11 is preferably though not necessarily provided with an integral lug or arm 13 by which it may be supported upon any suitable portion of the vehicle. With the particular type of vehicle shown in the drawing it has been found convenient to attach the bearing sleeves 11 to the diagonal basis 14 by which the fenders 16 are supported. Loosely journaled in the sleeve 11 is an oscillatory shaft 16 carrying at its upper end the usual fork or U shaped frame 17 in which the lamps are supported. The shaft 16 extends a considerable distance below the recessed lower end of the sleeve 11 as shown in Fig. 3 for the purpose hereinafter mentioned. Located in the upper end of the sleeve 11 is a cup or ball race 18 while carried upon the shaft 16 is the corresponding cone 19. Bearing balls 20 are interposed between the cup and cone. A dust cap 21 incloses the upper end of the sleeve 11 and protects the bearing 2. At the lower end of the sleeve 11 there is provided a flanged cup or ball race 22 which projects within the recess 12 with a peripheral flange bearing upon the extremity of the sleeve 11.

Projecting radially from the shaft 16 at a point adjacent to the top of the chamber or recess 12 is a stud 24. Projecting inward from the walls of the recess 12 in angular spaced relation one with the other and in a plane common with the stud 24 are two corresponding studs 25 and 26 which by the engagement of the stud 24 therewith, limit the oscillatory movement of the shaft 16 in either direction.

A helical spring 27 surrounds the shaft 16 within the recess or chamber 12, one end of said spring 27 being engaged with the stud 24 carried by the shaft 16 and the other end of the spring being engaged with the cup 22. In the drawing the cup 22 has been shown provided with a hole 28 for the reception of the end of the spring 27. The cup 22 is revolubly adjustable within the recess 12, the flange of the cup being provided with a plurality of holes 29 any one of which may be engaged over a pin 30 projecting from the face of the sleeve 11 to hold the cup 22 to its adjusted position. This revoluble adjustment of the cup 22 serves to place the spring 27 under tension.

Carried by a shaft 16 adjacent to the cup 22 is a corresponding bearing cone 31, while adjacent thereto and secured to the shaft 16 is a recessed collar 32. In the drawing the bearing cone 31 and the recessed collar 32 have been shown integral and connected with the shaft by means of a radially disposed stud or pin engaging the peripheral flange of the collar and extending into the shaft 16. Bearing walls 33 are interposed between the cone 31 and the cup or race 22.

This construction provides widely separated journal bearings for the shaft 16 obviating any tendency for any looseness or play to be magnified by the leverage of the fork 17 upon which the lamp is supported. The location of spring 27 intermediate the bearings of the shaft 16 has been found of material advantage and facilitates the ease of operation.

Loosely journaled upon the extension of the shaft 16 projecting below the sleeve 11 and extending within the recess of the collar 32 is an elongated sleeve 35 from which projects a radial arm 36. The upper end of the sleeve 35 is provided with a wide notch 37 within which the stud or pin 32* carried by the shaft 16 engages. The notch 37 extends throughout substantially one fourth the periphery of the sleeve thereby permitting the sleeve and arm 36, an independent oscillatory movement of substantially 90 degrees independent of the shaft. At each limit of this independent movement of the sleeve 35 the stud 32* will be engaged by the shoulder formed by the notch 37. The relation of the sleeve 35 and the stud or pin 32* is clearly shown in Fig. 5.

The construction is such that the spring 27 which has been placed under tension by the revoluble adjustment of the cup 22 tends to hold the stud 24 in engagement with the corresponding stud 25. If the arm 36 and the sleeve 35 are oscillated in one direction their movement will be independent of the shaft 16 whereas if they are rotated in the opposite direction, the shoulder formed by the notch 37 will engage the stud or pin 32* and by the further movement of the arms 26 and sleeve 35, the shaft 16 will be rotated in unison therewith, against the tension of the spring 27. This rotary movement of the shaft 16 is such that the stud 24 is moved away from the stud or stop 25 and toward the stud 26 by which its movement is limited. Upon the reverse movement of the sleeve 35 and the arm 36 the tension upon the spring 27 is relieved and the spring will return the shaft until the stud or pin 24 is again in engagement with the stud 25. The long bearing between the sleeve 35 and the shaft 16 obviates any tendency to magnify the looseness or play and provides a long bearing in which the wear is reduced to minimum.

The lamp supports thus described are arranged in pairs, the members of each pair being assembled right and left, that is, the spring 27 is connected in reversed direction and the stud or pin 32' is so located in relation with the notch 37 that the operative movement of the parts of the respective members forming the pair will be in opposite direction. That is, in one pair the free movement of the sleeve 35 and arm 36 and the direction in which the spring 37 tends to rotate the shaft are toward the left and in the other member both these movements are toward the right. The operating arms 36 of the respective lamp support are connected one to the other to move in unison by a transverse connecting rod 38. The construction and arrangement are such that when the rod 38 is reciprocated in one direction one of the sleeves 35 will be oscillated in a direction to engage the stud or pin 32' and will thereby cause the corresponding shaft 16 to be rotated in unison against the tension of the spring 27 while the corresponding sleeve 35 of the other member of the pair will oscillate away from the stud or pin 32' and independent of the shaft. When the connecting rod 38 is reciprocated in the opposite direction the operation of the respective members of the pair will be reversed. To reciprocate the connecting rod 38 there is provided an intermediate link 39 pivoted at 40 to the reciprocatory connecting rod 38 and having a pivotal connection 41 with the pitman 7 of the steering apparatus. Thus each reciprocatory movement of the pitman 7 necessary to adjust the guide wheels will cause a corresponding reciprocatory movement of the connecting link 38 to adjust the lamp support corresponding to the direction in which the vehicle is being turned. In Fig. 2 the parts have been shown by dotted lines in an operated position, the vehicle being turned toward the right and the right lamp being correspondingly oscillated. It is to be noted however that the diagonal direction of the shaft of light from the lamp shown in the dotted lines is not parallel with the wheels, but is cast at an acute angle therewith whereby the shaft of light will be directed to a region beyond the plane of the wheel.

From the above description it will be apparent that there is thus provided a device of the character described, possessing the particular features of advantage before enumerated as desirable but which obviously is susceptible of modification in its form, proportion, detail construction or arrangement of parts, without departing from the principle involved or sacrificing any of its advantages.

While in order to comply with the statute, the invention has been described in language more or less specific as to certain structural features, it is to be understood that the invention is not limited to any specific details, but that the means and construction herein described comprise but one mode of putting the invention into effect, and the invention is therefore claimed broadly in any of its possible forms or modifications within the scope of the appended claims.

Having thus described my invention, I claim:

1. The combination with a vehicle lamp, of an oscillatory shaft upon which the lamp is carried, an elongated stationarily mounted sleeve in which the shaft is journaled, a helical spring within the sleeve intermediate the bearings of said shaft and surrounding the shaft connected at one end to the shaft and a revoluble collar capable of being interengaged with the sleeve in different positions of rotary adjustment with which the opposite end of the spring is engaged, and an operating lever pivoted upon the shaft capable of a limited oscillatory movement independent of the shaft but capable of additional movement in unison with the shaft against the tension of the spring.

2. The combination with a vehicle lamp of an oscillatory shaft on which the lamp is carried, an elongated stationarily mounted sleeve in which the shaft is journaled and having in one end a counter bore of greater diameter than the shaft, a stop projecting radially from the shaft within the chamber formed by the counter bore, a corresponding stop projecting into the said chamber from the wall thereof in a plane common with the first mentioned stop, a helical spring located within the chamber against the tension of which the shaft is capable of oscillatory adjustment, adjustable means for varying the tension of the spring independent of the shaft, the movement of the shaft in relation with the sleeve being limited by the engagement of the stops, and an operating lever for the shaft.

3. The combination with a vehicle lamp of an oscillatory shaft on which the lamp is carried, an elongated stationarily mounted sleeve in which the shaft is journaled, a spring against the tension of which the shaft is revolubly adjustable, a stud carried by the shaft, an elongated sleeve journaled upon the shaft adjacent to the stud having an extended segmental notch in one end thereof engaging over the stud, and an operating arm carried by the sleeve, the construction and arrangement being such that the sleeve is free for independent oscillation within the limits of the segmental slot but further adjustment of the sleeve will cause the shaft to be rotated in unison therewith against the tension of the spring.

4. The combination with a vehicle lamp of an oscillatory shaft on which the lamp is carried, an elongated stationarily mounted sleeve in which the shaft is journaled, a spring against the tension of which the shaft is revolubly adjustable, a recessed collar carried by the shaft, an operating arm having an extended hub journaled on the shaft, the hub of which exceeds into the recess of the collar and is provided with a segmental notch in the extremity thereof, a stud located within the recess of the collar over which the notch engages, the construction and arrangement being such that the sleeve is free for independent oscillation within the limits of the segmental slot but further adjustment of the arm will cause the shaft to be rotated in unison therewith against the tension of the spring.

5. The combination with a vehicle lamp of an oscillatory shaft upon which the lamp is carried, an elongated stationarily located bearing sleeve, having a counter bore therein of greater diameter than the shaft forming an abutment therein, a helical spring located within the bore and surrounding the shaft, one end of which is connected to the shaft, an abutment for the opposite end of the spring revolubly adjustable in relation with the sleeve, means for securing the abutment to the sleeve in its adjusted position, and an operating lever carried by the shaft by which the shaft may be oscillated against the tension of the spring.

6. The combination with a vehicle lamp of an oscillatory shaft upon which the lamp is carried, an elongated stationarily located bearing sleeve having bearings at its opposite ends for the shaft, one of said bearings being revolubly adjustable in relation with the sleeve independent of the shaft, a helical spring located within the sleeve intermediate the bearings connected at one end to the revoluble bearing and at its opposite end to the shaft, means to secure the revoluble bearing to the sleeve and an operating lever by which the shaft may be rotated against the tension of the spring.

7. The combination with a vehicle lamp of an oscillatory shaft on which the lamp is carried, separated spaced bearings for the shaft, a helical spring surrounding the shaft intermediate the bearings having one end connected to the shaft and the other end stationarily secured in relation with the vehicle, a radially disposed stop carried by the shaft and a fixed stop co-acting therewith to arrest the movement of the shaft under the influence of the spring, and an operating arm journaled on the shaft capable of a limited oscillatory movement independent of the shaft and a further movement in unison with the shaft against the tension of the spring.

In testimony whereof, I have hereunto set my hand this 11 day of March, 1914.

HENRY EHLEN.

Witnesses:
 FRANK L. WALKER.
 ERVIE B. SHOMO.